(12) United States Patent
Just

(10) Patent No.: US 7,621,584 B2
(45) Date of Patent: Nov. 24, 2009

(54) CONVERTIBLE TOP COVER ATTACHMENT SYSTEM

(75) Inventor: Jan Just, Bloomfield Hills, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 0 days.

(21) Appl. No.: 10/598,278

(22) PCT Filed: Feb. 28, 2005

(86) PCT No.: PCT/US2005/006525

§ 371 (c)(1),
(2), (4) Date: Aug. 23, 2006

(87) PCT Pub. No.: WO2005/084980

PCT Pub. Date: Sep. 15, 2005

(65) Prior Publication Data

US 2007/0152462 A1 Jul. 5, 2007

Related U.S. Application Data

(60) Provisional application No. 60/548,627, filed on Feb. 27, 2004.

(51) Int. Cl.
*B60J 7/08* (2006.01)

(52) U.S. Cl. ............ 296/121; 296/107.04; 296/107.11
(58) Field of Classification Search ................. 296/121, 296/107.04, 107.09, 107.11
See application file for complete search history.

(56) References Cited

U.S. PATENT DOCUMENTS

| | | | | |
|---|---|---|---|---|
| 3,090,646 | A | * | 5/1963 | Johnson .................. 296/107.11 |
| 5,738,402 | A | * | 4/1998 | Aydt et al. ................... 296/118 |
| 6,491,334 | B1 | * | 12/2002 | Anders .................... 296/107.04 |
| 7,070,224 | B2 | * | 7/2006 | Tsuchida ..................... 296/135 |
| 7,290,824 | B2 | * | 11/2007 | Haltermann et al. ... 296/107.04 |
| 2001/0013712 | A1 | * | 8/2001 | Fischer et al. .......... 296/107.11 |
| 2008/0061582 | A1 | * | 3/2008 | Beierl et al. ............ 296/107.04 |

FOREIGN PATENT DOCUMENTS

WO      WO-93/21030 A1 * 10/1993

* cited by examiner

*Primary Examiner*—Jason S Morrow
(74) *Attorney, Agent, or Firm*—Brooks Kushman P.C.

(57) ABSTRACT

A system and method for attaching a cover (14) of a convertible top (12) of a motor vehicle. The system includes a cover (14) having an anchoring strip (50) and a structural support (16) having a recessed portion (32) and a plurality of retainer flanges (34). The anchoring strip (50) is disposed between the recessed portion (32) and the plurality of flanges (34) when the cover (14) is attached to the structural support (16).

14 Claims, 2 Drawing Sheets

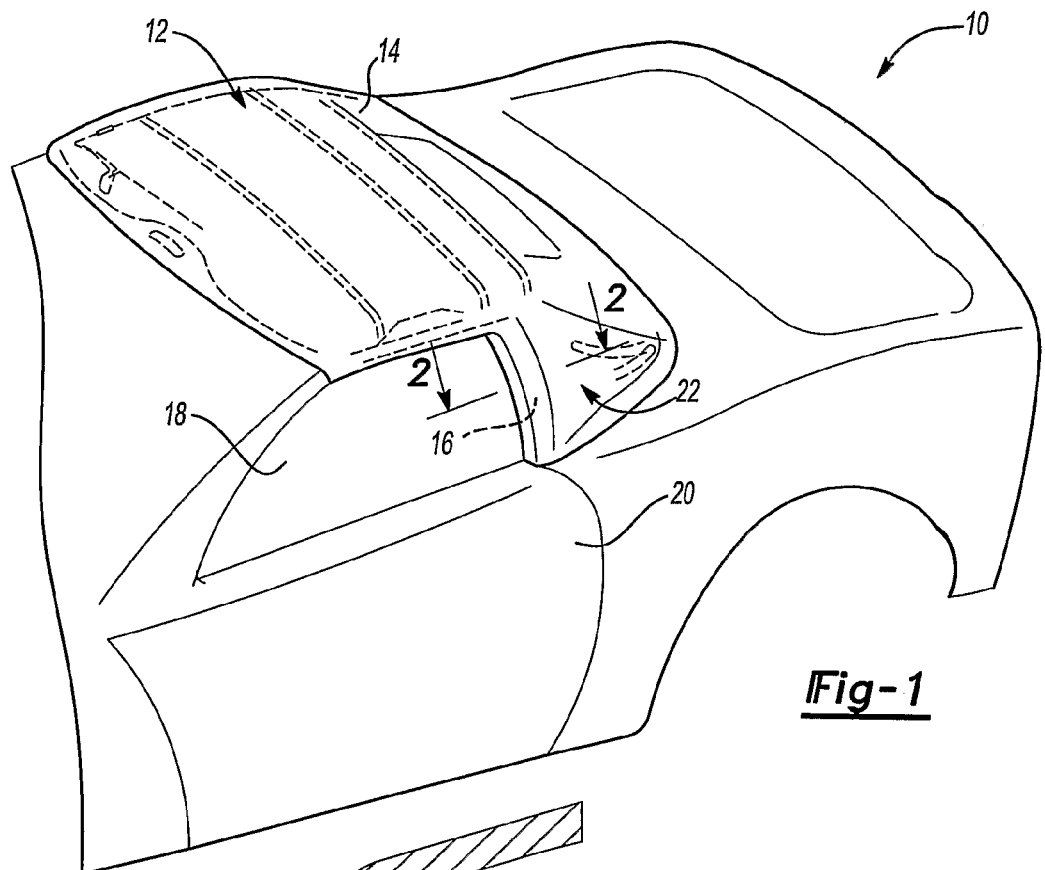
_Fig-1_
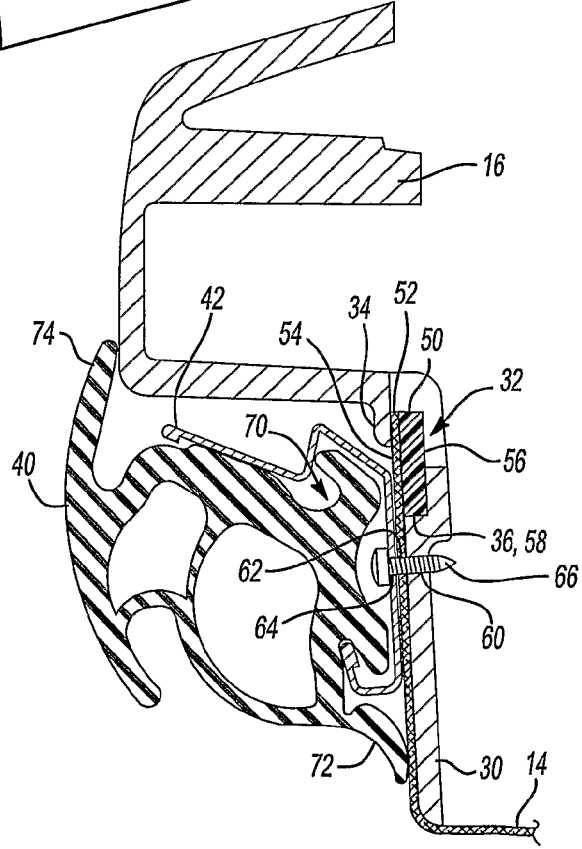
_Fig-2_

CONVERTIBLE TOP COVER ATTACHMENT SYSTEM

CROSS-REFERENCE TO RELATED APPLICATIONS

This application claims the benefit of U.S. provisional application Ser. No. 60/548,627 filed Feb. 27, 2004.

BACKGROUND OF THE INVENTION

1. Field of the Invention

The present invention relates to convertible tops and methods of securing a portion of a convertible top cover to a structural part.

2. Background Art

Convertible tops may be provided on vehicles to provide the option of converting a vehicle to an open top configuration. More particularly, a convertible top may be extended to cover a passenger compartment and may be retracted to provide an open passenger compartment.

Convertible tops generally include structural elements such as a top stack linkage, transversely extending bows, and a flexible top cover. The convertible top may also include a flexible or rigid glass back light. It is desirable that a convertible top is attractive when placed in its extended position. For example, the top cover must appear to be smooth and free of wrinkles, puckers or other surface irregularities when viewed from the exterior of the vehicle. The top cover in prior art designs may be secured to the top stack linkage by means of sewn seams, snaps, hook and loop strips, screws, rivets or other fastening devices. Many of such fastening systems provide spaced points of attachment between which the top cover material is spanned.

In areas between attachment points and, in some instances, near attachment points, folds, puckers and other surface irregularities may be created or develop over time. In some areas, for example, the B-pillar area located behind the window of the primary doors of a vehicle, it is difficult to obtain a smooth appearance and effective attachment of the top cover to the B-pillar.

Many of the prior art solutions for securing a top cover to the supporting structure of a convertible top require extensive manufacturing process steps and specialized tooling. Securing a top cover by sewing or with mechanical fasteners may require specialized tools and manual assembly operations that add to the cost of making the convertible top.

There is a need for a method and apparatus that facilitates attachment of the convertible top cover to structural support portions of the top stack linkage. There is also a need for a method of manufacturing a convertible top cover that lends itself to efficient manufacturing techniques that minimize labor expense and tooling requirements. The above problems and needs are addressed by Applicant's invention as described below.

SUMMARY OF THE INVENTION

According to one aspect of the present invention, a system for attaching a cover of a convertible top of a motor vehicle is provided. The system includes a cover, an anchoring strip, and a structural support. The cover has a peripheral edge. The structural support, which may be a B-pillar, is disposed proximate the motor vehicle and includes a recessed portion and a plurality of retainer flanges spaced apart from the recessed portion. The anchoring strip is disposed proximate the recessed portion and the cover is disposed proximate the plurality of retainer flanges when the cover is attached to the structural support.

The recessed portion and plurality of retainer flanges may be integrally formed with the structural support.

The recessed portion may include a step. The anchoring strip may be disposed proximate the step when the cover is attached to the structural support.

The anchoring strip may include a first surface, a second surface disposed opposite the first surface, and a third surface extending between the first and second surfaces. The first surface may be attached to the cover. The second surface may be disposed proximate the recessed portion. A third surface may be disposed proximate the step.

The system may include a seal retainer disposed proximate the cover. The seal retainer may be adapted to receive a seal. The seal retainer may be attached to the structural support with a fastener. First, second, and third holes may be disposed in the structural support, cover, and seal retainer, respectively. The fastener may engage the first, second, and third holes to couple the seal retainer, cover and structural support. The seal may conceal the fastener when received in the seal retainer.

The seal may include a mounting portion adapted to engage the seal retainer. The seal may also include first and second flaps. The first flap may be disposed proximate the cover and the second flap may be disposed proximate the structural support when the mounting portion engages the seal retainer.

According to another aspect of the present invention, a system for attaching a cover of the convertible top of a motor vehicle is provided. The system includes a cover, a structural support, and a seal retainer. The cover includes a peripheral edge and an anchoring strip disposed proximate the peripheral edge. The structural support includes a rib having a recessed portion and a plurality of retainer flanges spaced apart from the recessed portion. The recessed portion and plurality of flanges are integrally formed. The seal retainer is adapted to receive a seal. The anchoring strip and cover are disposed proximate the recessed portion and a fastener is inserted through the cover and seal retainer and into the rib when the cover is attached to a structural support.

The anchoring strip may be distribute tensioning forces applied to the cover when the cover is attached to the structural support.

According to another aspect of the present invention, a method of attaching a cover of the convertible top for a motor vehicle is provided. The method includes the steps of providing a cover having an anchoring strip, providing a structural support having a recessed portion and a plurality of retainer flanges, positioning the cover adjacent to the structural support such that the anchoring strip is disposed between the recessed portion and the plurality of retainer flanges, and inserting a fastener through the cover and into the structural support to secure the cover.

The step of positioning the cover may include positioning a portion of the cover proximate the plurality of retainer flanges. The step of positioning the cover may include positioning a seal retainer adjacent to the cover. The step of inserting the fastener may include inserting the fastener through the seal, retainer, cover and structural support to secure the cover and seal retainer to the structural support. The method may also include the step of inserting a seal into the seal retainer.

BRIEF DESCRIPTION OF THE DRAWINGS

FIG. 1 is fragmentary perspective view of a vehicle having a convertible top;

FIG. 2 is a cross sectional view taken along line 2-2 in FIG. 1; and

DETAILED DESCRIPTION OF THE EMBODIMENT(S)

Figure 3:
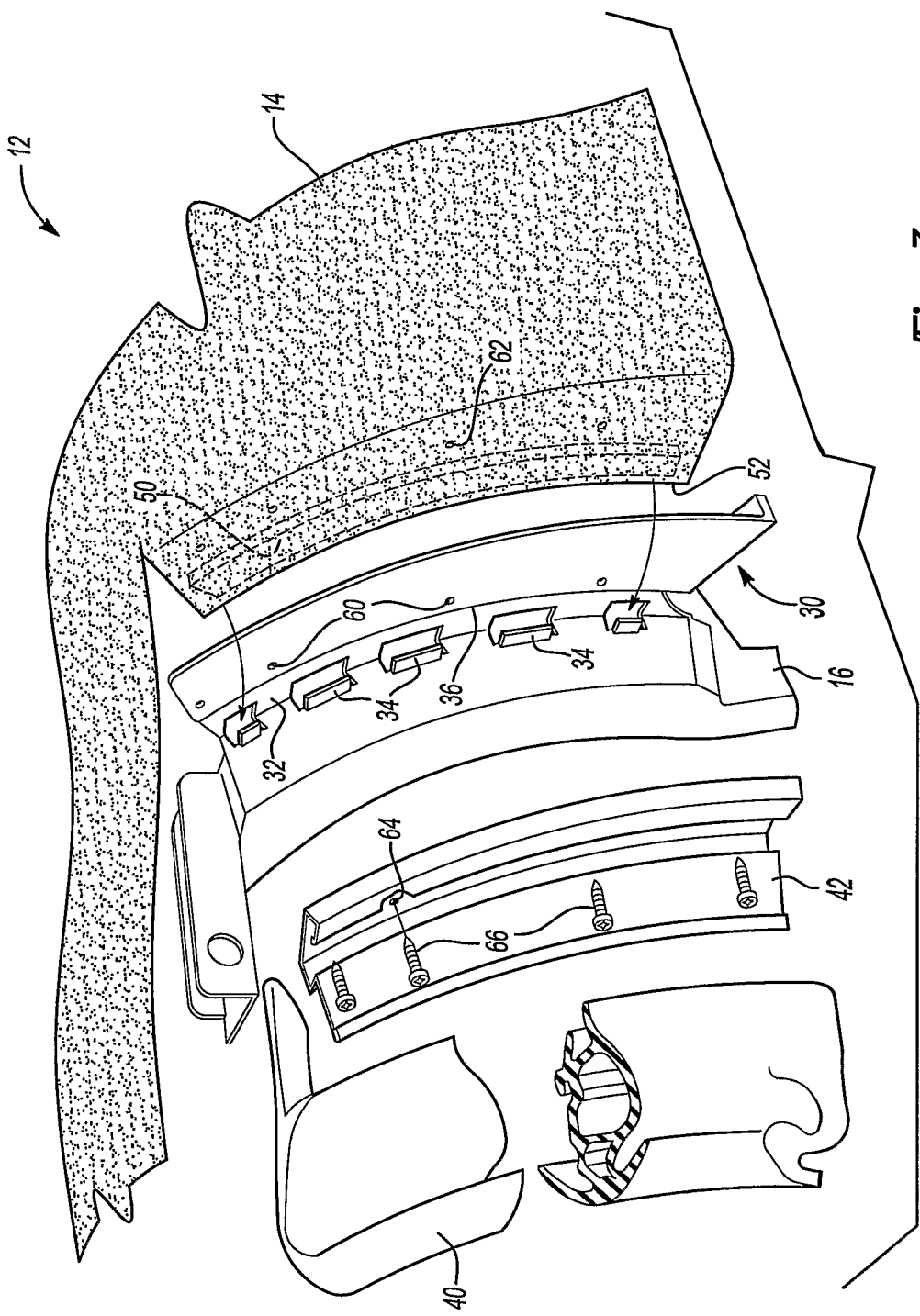
FIG. 3 is fragmentary exploded perspective view of a portion of a convertible top, a structural support, and an associated seal.

Referring to FIG. 1, a portion of a vehicle 10 is shown with a convertible top 12. The convertible top 12 is shown in its extended, or passenger compartment covering, position. The convertible top 12 includes a cover 14 that may be a fabric cover formed from a waterproof material, such as canvas or the like.

A structural support 16 may be disposed proximate the vehicle 10 when the convertible top 12 is extended. For example, in one embodiment of the present invention, the structural support 16 may be configured as a B-pillar portion that is disposed rearward of a window 18 of a primary vehicle door 20. The B-pillar may be adapted to engage or extend upward from a B-pillar area 22 when the convertible top 12 is extended. A B-pillar may be provided on both the driver and passenger side of the vehicle 10. In addition, the present invention may be adapted to facilitate securing a peripheral portion of a convertible top 12 to another structural feature, such as a frame or top stack linkage.

Referring to FIGS. 2 and 3, one embodiment of a structural support 16 configured as a B-pillar is shown. The structural support 16 may include a rib 30 having a recessed portion 32 and a plurality of retainer flanges 34. A step 36 may be disposed between the rib 30 and recessed portion 32. The retainer flanges 34 may be spaced apart from each other and spaced apart from the recessed portion 32. In addition, the recessed portion 32 and retainer flanges 34 may be integrally formed with the structural support 16.

An elastomeric seal 40 may be secured to the structural support 16 by means of a seal retainer 42. The seal retainer 42 may be a metal stamping to which the elastomeric seal 40 is assembled, as is well known in the art.

An anchoring strip 50 may be secured near a peripheral edge 52 of the cover 14. The anchoring strip 50 is formed of a resilient material to permit application over a surface having some curvature. The anchoring strip 50 may include a first surface 54, a second surface 56 disposed opposite the first surface 54, and a third surface 58 extending between the first and second surfaces 54,56. The anchoring strip 50 may be formed from a durable plastic material, such as polystyrene, polypropylene, ABS, or the like. The anchoring strip 50 is elongated and has a uniform cross section, as shown, but could also be shaped or contoured for a particular application.

The cover 14 is assembled to the structural support 16 by sliding the anchoring strip 50 forward over the structural support 16 (as indicated by the arrows in FIG. 3) until at least a portion of the anchoring strip 50 engages the recessed portion 32. The anchoring strip 50 and peripheral edge 52 of the cover 14 are inserted next to the plurality of retainer flanges 34. The peripheral edge 52 of the cover 14 and anchoring strip 50 are captured between the retainer flanges 34 and recessed portion 32. In the embodiment shown in FIG. 2, the second surface 56 is disposed proximate the recessed portion 32 and the third surface 58 is disposed proximate the step 36. The anchoring strip 50 provides a way to snap fit a peripheral edge 52 of the cover 14 onto the structural support 16 to hold it in place until the seal retainer 42 can be fastened to the structural support 16.

Screws may be inserted through first, second, and third holes 60,62,64 disposed in the rib 30, cover 14, and seal retainer 42, respectively. The screws 66 permanently secure the cover 14, anchoring strip 50, and seal retainer 42 against the structural support 16. The anchoring strip 50 provides a broad area of attachment without pressure points that could result in wrinkles or folds. The anchoring strip 50 also spreads the tensioning forces applied to the cover 14 to provide a durable and simply assembled connection of the cover 14 to the structural support 16.

The elastomeric seal 40 may be assembled to the seal retainer 42 as is best shown in FIG. 2. The elastomeric seal 40 has a mounting portion 70 with sufficient resilience to grasp the seal retainer 42 to hold the elastomeric seal 40 in place. The elastomeric seal 40 could be glued or bonded to the seal retainer 42, if required. In addition, the elastomeric seal 40 may include first and second flaps 72,74 disposed proximate the cover 14 and structural support 16, respectively, when the mounting portion 70 engages the seal retainer 42.

The structural support 16 and its associated features may be formed in one piece by a Thixomolding® process in which magnesium is heated and injection molded to net size and shape. With the Thixomolding® process, the recessed portion 34 and retainer flanges 36 may be formed to precise net shape dimensions in the same process that is used to form the entire structural support 16. Due to the strength and close tolerances of the Thixomolding® part, a rigid secure mounting can be provided for the anchoring strip 50 and cover 14. In addition, this process can accommodate complex structural support 16 shapes that would be difficult to form by conventional sheet metal forming processes and would require complex tab forming operations and/or assembly of multiple parts to obtain an equivalent B-pillar structure.

The structural support 16 could also be formed by die casting or any other suitable manufacturing process; however, it should be understood that other processes may not provide the same ease in manufacture and surface finish quality as the Thixomolding® process. In addition, die casting molds are subject to wear and can deteriorate over time, which could lead to unacceptable product variation. Die cast parts also require substantial post molding machining to remove flash, sprue marks, and surface imperfections caused by the die casting operation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for attaching a cover of a convertible top of a motor vehicle, the system comprising:
   a cover having a peripheral edge;
   an anchoring strip attached to the peripheral edge of the cover; and
   a structural support disposed proximate the motor vehicle, the structural support having a recessed portion and a plurality of retainer flanges spaced apart from the recessed portion;

wherein the anchoring strip and the peripheral edge of the cover are captured between the recessed portion and the plurality of retainer flanges when the cover is attached to the structural support by a retainer that is secured to the structural support through the cover.

2. The system of claim 1 wherein the recessed portion and plurality of retainer flanges are integrally formed with the structural support.

3. The system of claim 1 wherein the anchoring strip further comprises a first surface and a second surface disposed opposite the first surface, the first surface being attached to the cover and the second surface being disposed proximate the recessed portion when the cover is attached to the structural support.

4. The system of claim 3 wherein the recessed portion further comprises a step and the anchoring strip is disposed proximate the step when the cover is attached to the structural support.

5. The system of claim 4 wherein the anchoring strip further comprises a third surface extending between the first and second surfaces, the third surface being disposed proximate the step when the cover is attached to the structural support.

6. The system of claim 1 wherein the retainer receives a seal.

7. The system of claim 6 wherein the retainer is attached to the structural support with a fastener.

8. The system of claim 7 wherein the structural support further comprises a first hole spaced apart from the recessed portion for receiving the fastener.

9. A system for attaching a cover of a convertible top of a motor vehicle, the system comprising:
   a cover having a peripheral edge;
   an anchoring strip disposed proximate the peripheral edge;
   a seal retainer disposed proximate the cover, the seal retainer being adapted to receive a seal; and
   a structural support disposed proximate the motor vehicle, the structural support having a recessed portion and a plurality of retainer flanges spaced apart from the recessed portion;
   wherein the anchoring strip is disposed proximate the recessed portion and the cover is disposed proximate the plurality of retainer flanges when the cover is attached to the structural support, the structural support further includes a first hole spaced apart from the recessed portion, the cover and seal retainer include second and third holes, respectively, and a fastener engages the first, second, and third holes to couple the seal retainer, cover, and structural support.

10. The system of claim 9 further comprising a seal, wherein the seal conceals the fastener when received in the seal retainer.

11. The system of claim 9 further comprising a seal, wherein the seal further comprises a mounting portion adapted to engage the seal retainer.

12. The system of claim 11 wherein the seal further comprises first and second flaps, the first flap being disposed proximate the cover and the second flap being disposed proximate the structural support when the mounting portion engages the seal retainer.

13. A method of attaching a cover of a convertible top for a motor vehicle, the method comprising:
   providing a cover having an anchoring strip;
   providing a structural support having a recessed portion and a plurality of retainer flanges;
   positioning the cover adjacent to the structural support such that the anchoring strip is disposed between the recessed portion and the plurality of retainer flanges and positioning a seal retainer adjacent to the cover; and
   inserting a fastener through the seal retainer, cover, and structural support to secure the cover and seal retainer to the structural support.

14. The method of claim 13 further comprising the step of inserting a seal into the seal retainer.

* * * * *

UNITED STATES PATENT AND TRADEMARK OFFICE
CERTIFICATE OF CORRECTION

PATENT NO. : 7,621,584 B2 Page 1 of 1
APPLICATION NO. : 10/598278
DATED : November 24, 2009
INVENTOR(S) : Jan Just It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Fourteenth Day of December, 2010

David J. Kappos
*Director of the United States Patent and Trademark Office*